Patented Oct. 24, 1922.

1,433,168

UNITED STATES PATENT OFFICE.

YOSHITARO YAMAMOTO, OF KOBE, JAPAN, ASSIGNOR OF ONE-FOURTH TO ISOMA MIZUSAWA, OF HYOGO KEN, JAPAN, AND ONE-FOURTH TO TATSUZO KANO, OF KOBE, JAPAN.

PROCESS OF PREPARING ODORLESS AND COLORLESS OIL AND FLOUR FROM BEAN.

No Drawing.   Application filed November 26, 1919.   Serial No. 340,926.

*To all whom it may concern:*

Be it known that I, YOSHITARO YAMAMOTO, subject of Japan, residing at No. 5, Zitchome, Taikaidori, Hyogo, city of Kobe, Japan, have invented new and useful Improvements in Processes of Preparing Odorless and Colorless Oil and Flour from Bean, of which the following is a specification.

This invention relates to a process of preparing odorless and colorless flour from raw bean and extracting the oil therefrom, and consists in steeping in a weak solution of an organic acid raw bean coarsely broken and deprived of its bran, and when the broken up bean has swollen, lost all the odor inherent thereto, and been bleached almost to whiteness, in taking it out of the fluid and after washing with water for the purpose of removing all traces of acid, in drying it; after which the oil is separated therefrom and the residue is manufactured into flour.

The object of this invention is to obtain bean flour suitable for use as material for making bread, cake and the like, or as material for preparing washing powder, soap and the like, for which purposes the flour thus manufactured is best adapted as it has no disagreeable odor and is almost white. The oil extracted during this process is also almost colorless and retains no trace of the disagreeable odor inherent in the bean.

To explain my invention in detail, first soja bean is broken into coarse meal, and the bran removed therefrom. Then the bean meal is steeped in an aqueous solution containing .025–.075% of organic acid. A solution that has been found to produce good results is a mixture of 200 to 600 c. c. of table vinegar in 20 litres of water or of 7½ to 15 grams of glacial acetic acid in the same quantity of water. The liquid may then be heated, if desired, to a temperature not exceeding 60° C., or the heating may be omitted and the liquid allowed to stand until the pulverized bean has become swollen and bleached almost to whiteness, at which time it will be found that the bean has lost all of its offensive odor. Then all traces of acid are removed by washing it with water, and after drying it, the oil is extracted or pressed out therefrom by means of any suitable extracting apparatus, or pressing machine, the meal having previously been heated with steam to such a temperature that the albumin contained therein will not coagulate. After thus separating the oil from the mass, the residue is ground, and odorless and almost colorless flour will be obtained.

In carrying out this invention, bean meal may be treated with any harmless organic acid instead of table vinegar or acetic acid, and besides washing the pulverized bean with water to remove the acid with which it has been treated, the acid may be neutralized with a solution of sodium bicarbonate.

Bean oil and flour as hitherto prepared retain the disagreeable odor which is inherent in the bean and have other defects which detract from their quality as a food stuff. By my invention, however, as the matters which give odor and color to the bean, are first removed by treating the pulverized bean with a dilute solution of an organic acid, and thus converting them into soluble substances, the oil extracted or pressed out therefrom is odorless and almost colorless, so that its quality as a food is considerably improved. The residue remaining after separating the oil from the bean is also odorless and white. It retains also its albuminous ingredients in unaltered condition. Thus, flour manufactured therefrom is best fitted to be used as a food stuff and also as a body for soap, washing powder and the like.

I claim:—

1. A process of preparing odorless and colorless bean flour, which consists in treating coarsely pulverized soya bean with an aqueous solution of an organic acid thereby to remove odorous and coloring matters from the pulverized mass, drying said mass and extracting the oil therefrom, and grinding the residue.

2. The process of preparing odorless and colorless bean flour, which consists in treating coarsely pulverized soya bean with an aqueous solution containing .025–.075% of organic acid, washing the pulverized mass to remove the acid therefrom, extracting the oil from said mass, and grinding the residue.

3. The process of preparing odorless and colorless bean flour, which consists in steeping coarsely pulverized soya bean from which the bran has been removed in an aqueous solution containing .025 to .075 per cent. of organic acid heated to a low temperature and removing the acid therefrom, drying the pulverized mass, heating the mass with steam to a sufficient temperature to prevent coagulation of the albumin contained therein, pressing said mass thereby to remove the oil, and grinding the residue.

4. The process of preparing odorless and colorless bean flour, which consists in steeping coarsely pulverized soya bean from which the bran has been removed in an aqueous solution containing .025 to .075 per cent of organic acid heated to a temperature not exceeding 60° C. and removing the acid therefrom, drying the mass, heating the mass with steam to a sufficient temperature to prevent coagulation of the albumin contained therein, pressing said mass thereby to remove the oil therefrom, and grinding the residue.

In testimony whereof I have signed my name to this specification.

YOSHITARO YAMAMOTO.